United States Patent
Maetani et al.

(10) Patent No.: US 8,957,638 B2
(45) Date of Patent: Feb. 17, 2015

(54) BATTERY CONTROL CIRCUIT RESPONSIVE TO EXTERNAL SIGNAL INPUT

(75) Inventors: Fumihiko Maetani, Chiba (JP); Kazuaki Sano, Chiba (JP); Toshiyuki Koike, Chiba (JP); Takashi Ono, Chiba (JP)

(73) Assignee: Seiko Instruments Inc., Chiba (JP)

( * ) Notice: Subject to any disclaimer, the term of this patent is extended or adjusted under 35 U.S.C. 154(b) by 397 days.

(21) Appl. No.: 13/486,504

(22) Filed: Jun. 1, 2012

(65) Prior Publication Data

US 2012/0313574 A1      Dec. 13, 2012

(30) Foreign Application Priority Data

Jun. 9, 2011  (JP) .................... 2011-129398

(51) Int. Cl.
*H02J 7/34* (2006.01)
*H02J 7/00* (2006.01)

(52) U.S. Cl.
CPC .................... *H02J 7/008* (2013.01)
USPC .......... 320/128; 320/107; 320/134; 320/135; 320/136

(58) Field of Classification Search
CPC .. H03K 17/687; H01M 10/46; H01M 10/425; H01M 10/482; H01M 10/48; H01M 10/486; H01M 10/488; H01M 10/42; H01M 10/448; H02J 7/0068; H02J 7/0031
USPC ......................... 716/128, 134–136
See application file for complete search history.

(56) References Cited

U.S. PATENT DOCUMENTS

| | | | |
|---|---|---|---|
| 6,194,872 B1 * | 2/2001 | Schnell ........................ | 320/136 |
| 6,518,729 B2 * | 2/2003 | Onishi et al. ................. | 320/134 |
| 6,867,567 B2 | 3/2005 | Yokota et al. | |
| 8,138,722 B2 * | 3/2012 | Wang et al. ................... | 320/135 |
| 8,154,255 B2 * | 4/2012 | Wang et al. ................... | 320/136 |
| 8,384,349 B2 * | 2/2013 | Suzuki et al. ................. | 320/112 |
| 8,450,975 B2 * | 5/2013 | Kim ............................. | 320/134 |
| 8,525,482 B2 * | 9/2013 | Takeda ......................... | 320/136 |
| 2010/0085008 A1 * | 4/2010 | Suzuki et al. ................. | 320/112 |
| 2010/0097118 A1 * | 4/2010 | Wang et al. ................... | 327/427 |
| 2010/0123437 A1 * | 5/2010 | Takeda ......................... | 320/136 |

\* cited by examiner

*Primary Examiner* — Naum B Levin
(74) *Attorney, Agent, or Firm* — Brinks Gilson & Lione

(57) ABSTRACT

To solve a problem in that, even after a charge inhibition signal is input from an input terminal and a charge control transistor is turned OFF, if a load is connected between external terminals (EB+, EB−), a discharge current flows, and to solve another problem of power consumption of a charge/discharge control circuit (22), provided is a charge/discharge control circuit for controlling charge/discharge of a secondary battery, the charge/discharge control circuit including: a switch circuit for controlling a current that flows through the charge/discharge control circuit; a control circuit for controlling an operation of the switch circuit; and an input terminal to which a signal for controlling an operation of the charge/discharge control circuit is input from outside. In this way, when a signal is input to the input terminal from outside, the discharge current is interrupted, thereby reducing current consumption of the charge/discharge control circuit.

4 Claims, 3 Drawing Sheets

BATTERY CONTROL CIRCUIT RESPONSIVE TO EXTERNAL SIGNAL INPUT

RELATED APPLICATIONS

This application claims priority under 35 U.S.C. §119 to Japanese Patent Application No. 2011-129398 filed on Jun. 9, 2011, the entire content of which is hereby incorporated by reference.

BACKGROUND OF THE INVENTION

1. Field of the Invention

The present invention relates to a charge/discharge control circuit for detecting a voltage and an abnormality of a secondary battery and to a battery device including the charge/discharge control circuit, and more particularly, to a charge/discharge control circuit, which is powered down in response to a signal input from an external terminal and to a battery device including the charge/discharge control circuit.

2. Description of the Related Art

FIG. 3 illustrates a circuit diagram of a battery device including a conventional charge/discharge control circuit. The battery device including the conventional charge/discharge control circuit includes secondary batteries 1 to 4 (such as lithium ion secondary battery cells), a charge control transistor 14 and a discharge control transistor 16 each formed of an FET or the like, a charge/discharge control circuit 22, a microcomputer 21, and external terminals EB+ and EB−.

In the secondary batteries 1 to 4, a positive terminal of the secondary battery 1 is connected to the discharge control transistor 16, and a negative terminal of the secondary battery 4 is connected to the external terminal EB−. The discharge control transistor 16 and the charge control transistor 14 are connected in series. The charge control transistor 14 is connected to the external terminal EB+.

The charge control transistor 14 is a switch element for controlling charge to the secondary batteries 1 to 4 from a charger 20. The discharge control transistor 16 is a switch element for controlling discharge from the secondary batteries 1 to 4 to a load 19. When the charge/discharge control circuit 22 inhibits the charge to the secondary batteries 1 to 4, the charge/discharge control circuit 22 turns OFF the charge control transistor 14. When the charge/discharge control circuit 22 inhibits the discharge from the secondary batteries 1 to 4, the charge/discharge control circuit 22 turns OFF the discharge control transistor 16.

When a charge inhibition signal is input to a CTL terminal 13, the charge/discharge control circuit 22 turns OFF the charge control transistor 14 and turns ON the discharge control transistor 16. Then, even when the charge inhibition signal is input to the CTL terminal 13, if a VMP terminal 12 has an overcurrent detection voltage, the charge/discharge control circuit 22 cancels the charge inhibition signal of the CTL terminal 13.

In this way, in the case where the load 19 is connected between the external terminal EB+ and the external terminal EB−, even when the charge inhibition signal is input from the CTL terminal 13, both the charge control transistor 14 and the discharge control transistor 16 are not turned OFF, and hence it is possible to prevent a lock mode in which a voltage cannot be supplied to the load 19 (see, for example, Japanese Patent Application Laid-open No. 2002-320324 (FIG. 1)).

However, the conventional technology has a problem in that, when a charge inhibition signal is input from the CTL terminal 13 in order to prevent power consumption of the secondary battery at the time of shipment of the battery device, if a load is connected between the external terminal EB+ and the external terminal EB−, a discharge current flows via a parasitic diode 15, resulting in power consumption of the secondary battery. Further, the conventional technology has another problem of power consumption of the charge/discharge control circuit 22.

SUMMARY OF THE INVENTION

The present invention has been made for solving the above-mentioned problems, and provides a charge/discharge control circuit capable of preventing power consumption of a secondary battery and reducing current consumption of a charge/discharge control circuit at the time of shipment of a battery device, and also provides a battery device including the charge/discharge control circuit.

In order to solve the conventional problems, a charge/discharge control circuit according to an exemplary embodiment of the present invention has the following configuration.

A charge/discharge control circuit for controlling charge/discharge of a secondary battery includes: a switch circuit for controlling a current that flows through the charge/discharge control circuit; a control circuit for controlling an operation of the switch circuit; and an input terminal to which a signal for controlling an operation of the charge/discharge control circuit is input from outside.

According to the charge/discharge control circuit of the exemplary embodiment of the present invention, after a signal is input from the input terminal, a discharge control transistor is turned OFF to interrupt a discharge current flowing to an external load, to thereby power down the charge/discharge control circuit to reduce current consumption. Therefore, there is an effect that power consumption of the secondary battery can be prevented at the time of shipment of a battery device.

DETAILED DESCRIPTION OF THE PREFERRED EMBODIMENTS

Figure 1:
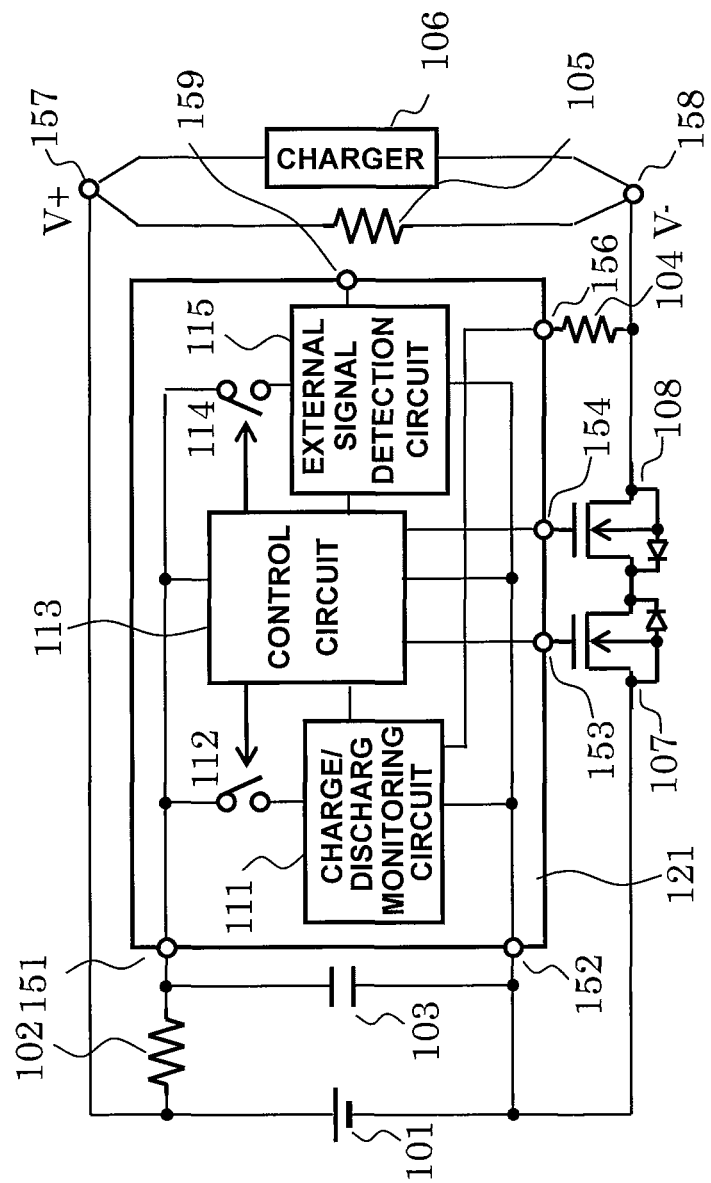
FIG. 1 is a circuit diagram of a battery device including a charge/discharge control circuit according to a first embodiment of the present invention.

FIG. 1 is a circuit diagram of a battery device including a charge/discharge control circuit according to a first embodiment of the present invention.

The battery device including the charge/discharge control circuit of the first embodiment includes a secondary battery 101, resistors 102 and 104, a capacitor 103, external terminals 157 and 158 to which a charger 106 and a load 105 are to be connected, an N-channel discharge FET 107, an N-channel charge FET 108, and a charge/discharge control circuit 121. The charge/discharge control circuit 121 includes a charge/discharge monitoring circuit 111, a control circuit 113, an external signal detection circuit 115, switch circuits 112 and 114, and terminals 151, 152, 153, 154, 156, and 159.

A positive terminal of the secondary battery 101 is connected to one terminal of the resistor 102 and the external terminal 157, and a negative terminal thereof is connected to one terminal of the capacitor 103, the terminal 152 of the charge/discharge control circuit 121, and a source of the N-channel discharge FET 107. The other terminal of the resistor 102 is connected to the other terminal of the capacitor 103 and the terminal 151 of the charge/discharge control circuit 121. The terminal 151 of the charge/discharge control circuit 121 is connected to one terminal of the switch circuit 112, the control circuit 113, and one terminal of the switch circuit 114. The terminal 152 of the charge/discharge control circuit 121 is connected to the charge/discharge monitoring circuit 111, the control circuit 113, and the external signal detection circuit 115. The other terminal of the switch circuit 112 is connected to the charge/discharge monitoring circuit 111. The other terminal of the switch circuit 114 is connected to the external signal detection circuit 115. The charge/discharge monitoring circuit 111 is connected to the control circuit 113 and the terminal 156. The external signal detection circuit 115 is connected to the control circuit 113 and the terminal 159. The control circuit 113 is connected to the terminal 153 and the terminal 154, and outputs a control signal to the switch circuits 112 and 114. A drain of the N-channel discharge FET 107 is connected to a drain of the N-channel charge FET 108, and a gate of the N-channel discharge FET 107 is connected to the terminal 153. A source of the N-channel charge FET 108 is connected to the external terminal 158 and a gate thereof is connected to the terminal 154. One terminal of the resistor 104 is connected to the terminal 156 and the other terminal thereof is connected to the external terminal 158.

Next, the operation of the battery device including the charge/discharge control circuit of the first embodiment is described.

When the secondary battery 101 is connected, the control circuit 113 outputs a signal to turn ON the switch circuit 112 and the switch circuit 114, thereby enabling the charge/discharge monitoring circuit 111 and the external signal detection circuit 115. When the charger 106 is connected between the external terminals 157 and 158 and when the secondary battery 101 becomes an overcharged state, the charge/discharge monitoring circuit 111 detects the overcharge and outputs an overcharge inhibition signal to the control circuit 113. In response to the overcharge inhibition signal, the control circuit 113 outputs Lo to the terminal 154 to turn OFF the N-channel charge FET 108, thereby providing protection. When the load 105 is connected between the external terminals 157 and 158 and when the secondary battery 101 becomes an overdischarged state, the charge/discharge monitoring circuit 111 detects the overdischarge and outputs an overdischarge inhibition signal to the control circuit 113. In response to the overdischarge inhibition signal, the control circuit 113 outputs Lo to the terminal 153 to turn OFF the N-channel discharge FET 107, thereby providing protection. When the external terminals 157 and 158 are short-circuited and when the secondary battery 101 becomes an overcurrent state, the charge/discharge monitoring circuit 111 detects an increase in voltage of the terminal 156 and outputs an overcurrent inhibition signal to the control circuit 113. In response to the overcurrent inhibition signal, the control circuit 113 outputs Lo to the terminal 154 to turn OFF the N-channel charge FET 108, thereby providing protection.

When a signal is input to the terminal 159, the external signal detection circuit 115 detects the signal and outputs an external signal detection signal to the control circuit 113. In response to the external signal detection signal, the control circuit 113 outputs Lo to the terminal 153, Hi to the terminal 154, and a turn-OFF signal to the switch circuits 112 and 114.

In this manner, the N-channel discharge FET 107 is turned OFF and the N-channel charge FET 108 is turned ON so that the charge/discharge control circuit 121 becomes a power-down state in which the operations of the charge/discharge monitoring circuit 111 and the external signal detection circuit 115 are suspended. Thus, power consumption can be reduced. In order to release the power-down state, it is necessary to connect the charger 106 between the external terminals 157 and 158. Therefore, through the input of a signal from the terminal 159 at the time of shipment of the battery device, a storage period of the secondary battery 101 can be prolonged.

Note that, the switch circuits 112 and 114 are used to suspend the operations of the charge/discharge monitoring circuit 111 and the external signal detection circuit 115, but those operations may be suspended by another method.

As described above, according to the battery device including the charge/discharge control circuit of the first embodiment, through the input of a signal to the terminal 159, the N-channel discharge FET 107 is turned OFF and the N-channel charge FET 108 is turned ON so that the charge/discharge control circuit 121 becomes the power-down state. Thus, power consumption can be reduced. Then, a signal is input from the terminal 159 at the time of shipment of the battery device. In this way, a storage period of the secondary battery 101 can be prolonged.

Figure 2:
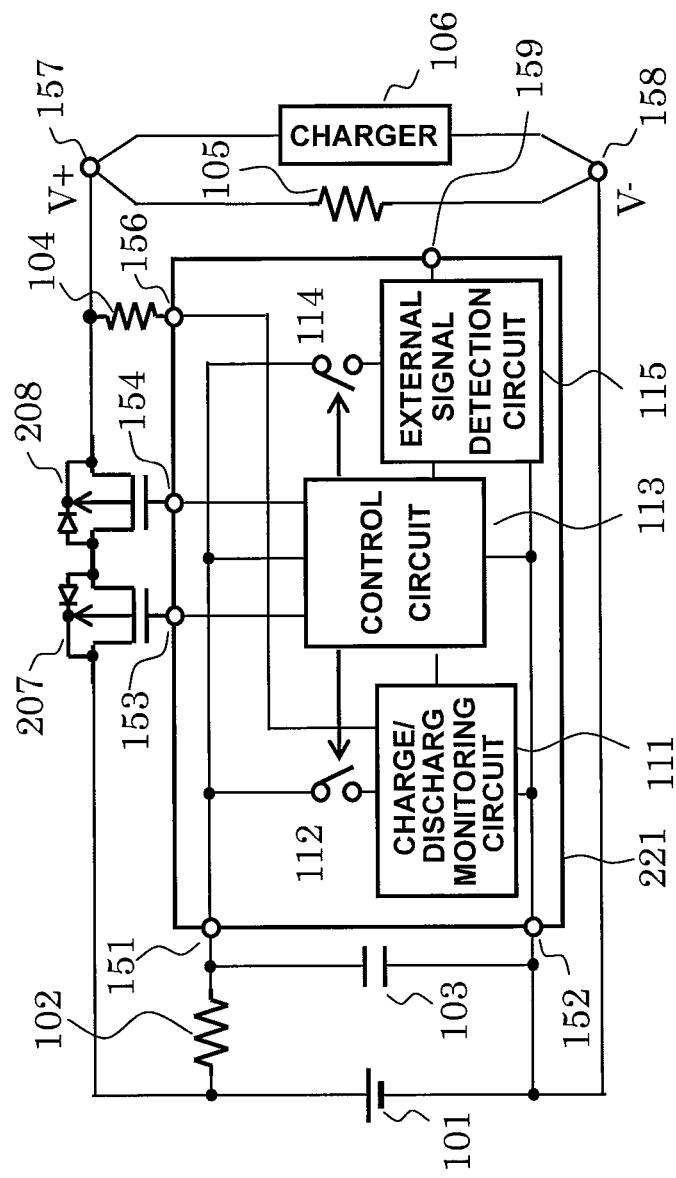
FIG. 2 is a circuit diagram of a battery device including a charge/discharge control circuit according to a second embodiment of the present invention.
Figure 3:
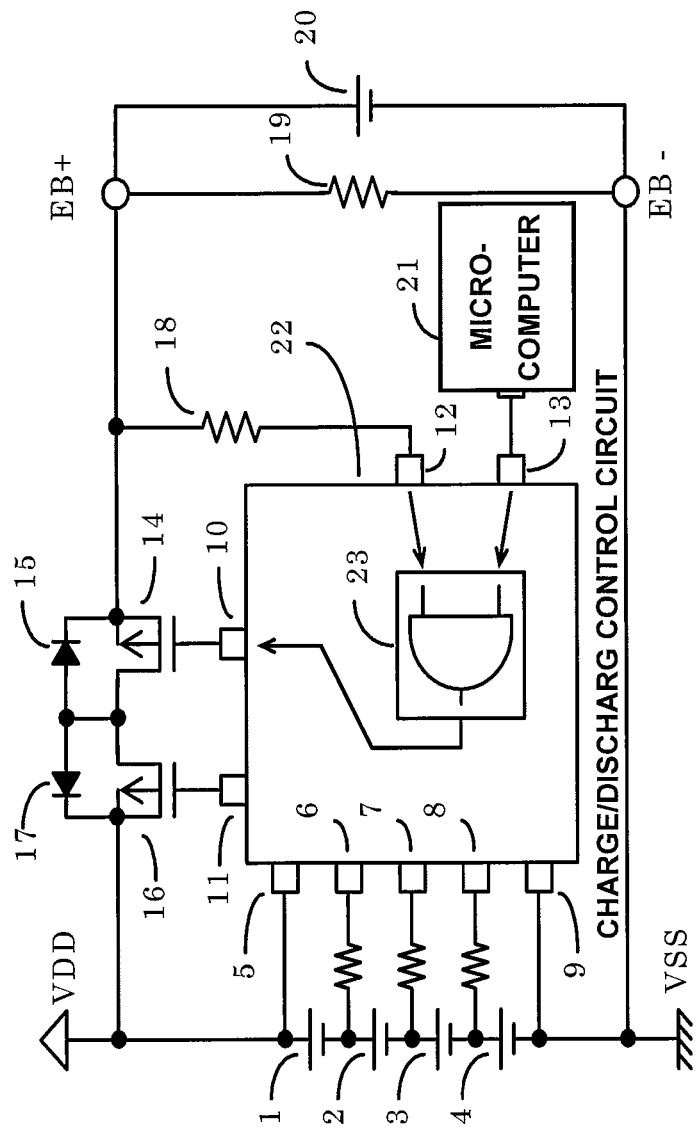
FIG. 3 is a circuit diagram of a battery device including a conventional charge/discharge control circuit.

FIG. 2 is a circuit diagram of a battery device including a charge/discharge control circuit 221 that includes an overcurrent protection circuit according to a second embodiment of the present invention. The difference from FIG. 1 is that the N-channel discharge FET 107 is changed to a P-channel discharge FET 207 and the N-channel charge FET 108 is changed to a P-channel discharge FET 208.

Connections are described. The P-channel discharge FET 207 has a source connected to the positive terminal of the secondary battery 101, a drain connected to a drain of the P-channel charge FET 208, and a gate connected to the terminal 153. The P-channel charge FET 208 has a source connected to the external terminal 157 and a gate connected to the terminal 154. Other connections are the same as those in the first embodiment.

Next, the operation of the battery device including the charge/discharge control circuit of the second embodiment is described.

When the secondary battery 101 is connected, the control circuit 113 outputs a signal to turn ON the switch circuit 112 and the switch circuit 114, thereby enabling the charge/discharge monitoring circuit 111 and the external signal detection circuit 115. When the charger 106 is connected between the external terminals 157 and 158 and when the secondary battery 101 becomes an overcharged state, the charge/discharge monitoring circuit 111 detects the overcharge and outputs an overcharge inhibition signal to the control circuit 113. In response to the overcharge inhibition signal, the control circuit 113 outputs Hi to the terminal 154 to turn OFF the P-channel charge FET 208, thereby providing protection. When the load 105 is connected between the external terminals 157 and 158 and when the secondary battery 101 becomes an overdischarged state, the charge/discharge monitoring circuit 111 detects the overdischarge and outputs an overdischarge inhibition signal to the control circuit 113. In response to the overdischarge inhibition signal, the control circuit 113 outputs Hi to the terminal 153 to turn OFF the P-channel discharge FET 207, thereby providing protection. When the external terminals 157 and 158 are short-circuited and when the secondary battery 101 becomes an overcurrent state, the charge/discharge monitoring circuit 111 detects an increase in voltage of the terminal 156 and outputs an overcurrent inhibition signal to the control circuit 113. In response to the overcurrent inhibition signal, the control circuit 113 outputs Hi to the terminal 154 to turn OFF the P-channel charge FET 208, thereby providing protection.

When a signal is input to the terminal 159, the external signal detection circuit 115 detects the signal and outputs an external signal detection signal to the control circuit 113. In response to the external signal detection signal, the control circuit 113 outputs Hi to the terminal 153, Lo to the terminal 154, and a turn-OFF signal to the switch circuits 112 and 114. In this manner, the P-channel discharge FET 207 is turned OFF and the P-channel charge FET 208 is turned ON so that the charge/discharge control circuit 221 becomes a power-down state in which the operations of the charge/discharge monitoring circuit 111 and the external signal detection circuit 115 are suspended. Thus, power consumption can be reduced. In order to release the power-down state, it is necessary to connect the charger 106 between the external terminals 157 and 158. Therefore, through the input of a signal from the terminal 159 at the time of shipment of the battery device, a storage period of the secondary battery 101 can be prolonged.

Note that, the switch circuits 112 and 114 are used to suspend the operations of the charge/discharge monitoring circuit 111 and the external signal detection circuit 115, but those operations may be suspended by another method.

As described above, according to the battery device including the charge/discharge control circuit that includes the overcurrent protection circuit of the second embodiment, through the input of a signal to the terminal 159, the P-channel discharge FET 207 is turned OFF and the P-channel charge FET 208 is turned ON so that the charge/discharge control circuit 221 becomes the power-down state. Thus, power consumption can be reduced. Then, a signal is input from the terminal 159 at the time of shipment of the battery device. In this way, a storage period of the secondary battery 101 can be prolonged.

What is claimed is:

1. A charge/discharge control circuit for controlling charge/discharge of a secondary battery, the secondary battery connected to an external terminal by charge and discharge transistors, the charge/discharge control circuit comprising:
    a switch circuit for controlling a current that flows through the charge/discharge control circuit;
    a control circuit for controlling an operation of the switch circuit and the charge and discharge transistors;
    an input terminal that receives an external signal for controlling an operation of the charge/discharge control circuit;
    an external signal detection circuit connected to the input terminal; and
    a charge/discharge monitoring circuit,
    wherein the external signal detection circuit is connected to a positive terminal of the secondary battery via the switch circuit, and the charge/discharge monitoring circuit is connected to the positive terminal of the secondary battery via the switch circuit.

2. A charge/discharge control circuit according to claim 1,
    wherein the switch circuit comprises a first switch circuit and a second switch circuit,
    an output of the external signal detection circuit is connected to the control circuit,
    a power supply of the external signal detection circuit is connected to a positive terminal of the secondary battery via the first switch circuit,
    a power supply of the charge/discharge monitoring circuit is connected to the positive terminal of the secondary battery via the second switch circuit, and
    when a signal is input to the input terminal, the control circuit outputs a signal for turning OFF the first switch circuit and the second switch circuit.

3. A battery device, comprising:
    a chargeable/dischargeable secondary battery;
    a charge/discharge control switch provided in a charge/discharge path of the chargeable/dischargeable secondary battery; and
    the charge/discharge control circuit according to claim 2, for monitoring a voltage of the chargeable/dischargeable secondary battery and opening/closing the charge/discharge control switch to control charge/discharge of the chargeable/dischargeable secondary battery.

4. A battery device, comprising:
    a chargeable/dischargeable secondary battery;
    a charge/discharge control switch provided in a charge/discharge path of the chargeable/dischargeable secondary battery; and
    the charge/discharge control circuit according to claim 1, for monitoring a voltage of the chargeable/dischargeable secondary battery and opening/closing the charge/discharge control switch to control charge/discharge of the chargeable/dischargeable secondary battery.

* * * * *